US008352746B2

(12) United States Patent
Jonas

(10) Patent No.: US 8,352,746 B2
(45) **Date of Patent: *Jan. 8, 2013**

(54) AUTHORIZED ANONYMOUS AUTHENTICATION

(75) Inventor: Jeffrey J. Jonas, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 1 day.

This patent is subject to a terminal disclaimer.

(21) Appl. No.: 12/709,333

(22) Filed: Feb. 19, 2010

(65) Prior Publication Data

US 2010/0153738 A1 Jun. 17, 2010

Related U.S. Application Data

(63) Continuation of application No. 10/750,482, filed on Dec. 31, 2003, now Pat. No. 7,702,919.

(60) Provisional application No. 60/437,416, filed on Dec. 31, 2002.

(51) Int. Cl.
*G06F 21/00* (2006.01)

(52) U.S. Cl. ................................ 713/186; 726/5; 726/17

(58) Field of Classification Search .................. 713/186, 713/182, 185; 726/2–5, 9, 19, 20; 705/64, 705/65, 74; 340/5.52, 5.53; 235/380, 382
See application file for complete search history.

(56) References Cited

U.S. PATENT DOCUMENTS 1,261,167 A 4/1918 Russell
3,659,085 A 4/1972 Porter
4,232,313 A 11/1980 Fleishman
4,981,370 A 1/1991 Dziewit et al.
5,010,478 A 4/1991 Deran (Continued)

FOREIGN PATENT DOCUMENTS

DE 19715644 10/1998

(Continued)

OTHER PUBLICATIONS

Ratha et al., "Enhancing security and privacy in biometric-based authentication systems," Aug. 2001. IBM Systems Journal. 21 pages.*

(Continued)

*Primary Examiner* — Nirav B Patel
(74) *Attorney, Agent, or Firm* — Gates & Cooper LLP

(57) ABSTRACT

A method, program and system for processing data is disclosed. The method, program and system comprising the steps of: (a) receiving (e.g., during an enrollment process) a first biometric data and a first personal key, (b) processing the first biometric data and the first personal key through an irreversible cryptographic algorithm, sometimes after: (i) generating one or more variants from the first biometric data, (ii) processing the first personal key through a reversible cryptographic algorithm, and (iii) adding salt to the first biometric data or first personal key, (c) receiving (e.g., during an authentication process) a second biometric data and a second personal key, (d) processing the second biometric data and the second personal key through the irreversible cryptographic algorithm, (e) comparing the second processed data to the first processed data, and (f) generating a signal pertaining to the comparison of the second processed data to the first processed data, such as: (i) a confirmation reflecting authentication when the second processed data matches the first processed data (sometimes allowing access to a facility or system) or (ii) a denial reflecting no confirmation when the second processed data does not match the first processed data.

21 Claims, 2 Drawing Sheets

U.S. PATENT DOCUMENTS

| | | | | |
|---|---|---|---|---|
| 5,229,764 | A | 7/1993 | Matchett et al. | |
| 5,403,639 | A | 4/1995 | Belsan et al. | |
| 5,454,101 | A | 9/1995 | Mackay et al. | |
| 5,534,855 | A | 7/1996 | Shockley et al. | |
| 5,555,409 | A | 9/1996 | Leenstra et al. | |
| 5,560,006 | A | 9/1996 | Layden et al. | |
| 5,608,907 | A | 3/1997 | Fehskens et al. | |
| 5,659,731 | A | 8/1997 | Gustafson | |
| 5,675,785 | A | 10/1997 | Hall et al. | |
| 5,758,343 | A | 5/1998 | Vigil et al. | |
| 5,764,977 | A | 6/1998 | Oulid-Aissa et al. | |
| 5,778,375 | A | 7/1998 | Hecht | |
| 5,781,911 | A | 7/1998 | Young et al. | |
| 5,784,464 | A | 7/1998 | Akiyama et al. | |
| 5,794,246 | A | 8/1998 | Sankaran et al. | |
| 5,799,309 | A | 8/1998 | Srinivasan | |
| 5,819,263 | A | 10/1998 | Bromley et al. | |
| 5,848,373 | A | 12/1998 | DeLorme et al. | |
| 5,878,416 | A | 3/1999 | Harris et al. | |
| 5,892,828 | A | 4/1999 | Perlman | |
| 5,933,831 | A | 8/1999 | Jorgensen | |
| 5,991,408 | A | 11/1999 | Pearson et al. | |
| 5,991,733 | A | 11/1999 | Aleia et al. | |
| 5,991,758 | A | 11/1999 | Ellard | |
| 5,991,765 | A | 11/1999 | Vethe | |
| 5,995,097 | A | 11/1999 | Tokumine et al. | |
| 5,995,973 | A | 11/1999 | Daudenarde | |
| 6,014,670 | A | 1/2000 | Zamanian et al. | |
| 6,032,158 | A | 2/2000 | Mukhopadhyay et al. | |
| 6,035,295 | A | 3/2000 | Klein | |
| 6,035,300 | A | 3/2000 | Cason et al. | |
| 6,035,306 | A | 3/2000 | Lowenthal et al. | |
| 6,041,410 | A | 3/2000 | Hsu et al. | |
| 6,044,378 | A | 3/2000 | Gladney | |
| 6,049,805 | A | 4/2000 | Drucker et al. | |
| 6,052,693 | A | 4/2000 | Smith et al. | |
| 6,058,477 | A | 5/2000 | Kusakabe et al. | |
| 6,065,001 | A | 5/2000 | Ohkubo et al. | |
| 6,073,140 | A | 6/2000 | Morgan et al. | |
| 6,076,167 | A | 6/2000 | Borza | |
| 6,092,199 | A | 7/2000 | Dutcher et al. | |
| 6,122,641 | A | 9/2000 | Williamson et al. | |
| 6,122,757 | A | 9/2000 | Kelley | |
| 6,151,676 | A | 11/2000 | Cuccia et al. | |
| 6,160,903 | A | 12/2000 | Hamid et al. | |
| 6,167,517 | A | 12/2000 | Gilchrist et al. | |
| 6,185,557 | B1 | 2/2001 | Liu | |
| 6,202,151 | B1 * | 3/2001 | Musgrave et al. | 713/186 |
| 6,208,990 | B1 | 3/2001 | Suresh et al. | |
| 6,263,446 | B1 | 7/2001 | Kausik et al. | |
| 6,272,495 | B1 | 8/2001 | Hetherington | |
| 6,310,966 | B1 * | 10/2001 | Dulude et al. | 382/115 |
| 6,317,834 | B1 | 11/2001 | Gennaro et al. | |
| 6,334,132 | B1 | 12/2001 | Weeks | |
| 6,339,775 | B1 | 1/2002 | Zamanian et al. | |
| 6,357,004 | B1 | 3/2002 | Davis | |
| 6,385,604 | B1 | 5/2002 | Bakalash et al. | |
| 6,418,450 | B2 | 7/2002 | Daudenarde | |
| 6,446,210 | B1 | 9/2002 | Borza | |
| 6,460,037 | B1 | 10/2002 | Weiss et al. | |
| 6,523,041 | B1 | 2/2003 | Morgan et al. | |
| 6,684,334 | B1 | 1/2004 | Abraham | |
| 6,694,025 | B1 | 2/2004 | Epstein et al. | |
| 6,697,947 | B1 | 2/2004 | Matyas, Jr. et al. | |
| 6,734,783 | B1 | 5/2004 | Anbai | |
| 6,743,022 | B1 | 6/2004 | Sarel | |
| 6,819,219 | B1 | 11/2004 | Bolle et al. | |
| 6,819,797 | B1 | 11/2004 | Smith | |
| 6,886,747 | B2 | 5/2005 | Snapp | |
| 6,968,338 | B1 | 11/2005 | Gawdiak et al. | |
| 7,024,562 | B1 * | 4/2006 | Flink et al. | 713/186 |
| 7,047,418 | B1 * | 5/2006 | Ferren et al. | 713/186 |
| 7,188,362 | B2 * | 3/2007 | Brandys | 726/9 |
| 7,200,549 | B1 * | 4/2007 | Fujii et al. | 713/161 |
| 7,200,602 | B2 | 4/2007 | Jonas | |
| 7,702,919 | B2 | 4/2010 | Jonas | |
| 2002/0023088 | A1 | 2/2002 | Thwaites | |
| 2002/0112177 | A1 * | 8/2002 | Voltmer et al. | 713/200 |
| 2002/0124176 | A1 * | 9/2002 | Epstein | 713/186 |
| 2002/0184509 | A1 | 12/2002 | Scheidt et al. | |
| 2003/0030733 | A1 | 2/2003 | Seaman et al. | |
| 2003/0084301 | A1 * | 5/2003 | Krawetz | 713/184 |
| 2003/0091218 | A1 * | 5/2003 | Hamid | 382/124 |
| 2003/0097380 | A1 | 5/2003 | Mulhern et al. | |
| 2003/0154194 | A1 | 8/2003 | Jonas | |
| 2003/0182018 | A1 | 9/2003 | Snapp | |
| 2003/0182568 | A1 | 9/2003 | Snapp et al. | |
| 2003/0191739 | A1 | 10/2003 | Chatterjee et al. | |
| 2004/0007616 | A1 | 1/2004 | Snapp | |
| 2004/0049682 | A1 | 3/2004 | Wilson et al. | |
| 2004/0128274 | A1 | 7/2004 | Snapp et al. | |
| 2004/0162802 | A1 | 8/2004 | Jonas | |
| 2004/0210763 | A1 | 10/2004 | Jonas | |
| 2005/0060556 | A1 | 3/2005 | Jonas | |
| 2005/0066182 | A1 | 3/2005 | Jonas | |
| 2006/0010119 | A1 | 1/2006 | Jonas | |
| 2007/0038664 | A1 | 2/2007 | Jonas | |
| 2007/0239705 | A1 | 10/2007 | Hunt et al. | |
| 2010/0153738 | A1 | 6/2010 | Jonas | |

FOREIGN PATENT DOCUMENTS

| | | | |
|---|---|---|---|
| JP | 2040781 | | 2/1990 |
| JP | 10-255005 | | 9/1998 |
| JP | 2001-092787 | | 4/2001 |
| JP | 2001512654 | | 8/2001 |
| JP | 2001513227 | A | 8/2001 |
| JP | 2001-251295 | | 9/2001 |
| JP | 2002-132731 | | 5/2002 |
| JP | 2002-269510 | | 9/2002 |
| JP | 2002532997 | A | 10/2002 |
| JP | 2002-353958 | | 12/2002 |
| JP | 2002-366527 | | 12/2002 |
| JP | 2003501877 | A | 1/2003 |
| JP | 2003-280994 | | 10/2003 |
| WO | WO9933219 | | 7/1999 |
| WO | WO2004/006495 | | 1/2004 |

OTHER PUBLICATIONS

Supplemental European Search Report, Application No. EP 03815009, dated Aug. 6, 2009.

Menezes et al., Chapter 10 Identification and Entity Authentication, Handbook of Applied Cryptography, CRC Press, 1996, pp. 385-424.

Hanming Tu, Pattern Recognition and Geographical Data Standarization, The Proceedings of Geoinformatics '99 Conference, Jun. 19-21, 1999, pp. 1-7.

Matchware Technologies Inc., AUTOSTAN, Generalized Standardization System, User's Manual Version 4.6, Feb. 11, 1998, pp. 1-90.

Vality Technology Incorporated, INTEGRITY, Data Re-engineering Environment, SUPERSTAN User Guide Version 2.5, Mar. 1998.

Written Opinion for International Application No. PCT/US02/41630 dated Jan. 19, 2005.

Written Opinion for International Application No. PCT/U504/09035 dated Nov. 4, 2004.

International Scorch Report from PCT/US03/35607 dated Apr. 23, 2004.

International Search Report for PCT/US04/03465 dared Apr. 7, 2005.

International Search Report for PCT/US04/09035 dated Nov. 4, 2004.

International Search Report from PCT/US03/41662, dated May 28, 2004.

International Search Report from PCT/US03/35607, dated Apr. 24, 2004.

Jaro, "Record Linkage Research and the Calibration of Record Linkage Algorithms", U.S. Bureau of the Census, Report No. rr-84/27 (Aug. 9, 1984).

DeWitt et al., *An Evaluation of Non-Equijoin Algorithms*, Proc. 17th Intl. Conf. on Very Large Data Bases, Sep. 1991, pp. 443-452.

Verykios et al., *A Bayesian decision model for cost optimal record matching*, The VLDB Journal, 2000, vol. 12, Nos. 28-450, pp. 28-40.

Yuwono et al., *Search and Ranking Algorithms for Locating Resources on the World Wide Web*, Intl. Conf. on Data Engineering, 1996, pp. 164-171.

Hou et al., *Medical Image Retrieval by Spatial Features*, 1992 IEEE Intl. Conf. on Systems, Man and Cybernetics, Oct. 1992, vol. 1, pp. 1364-1369.
Callan et al., *Searching Distributed Collections With Inference Networks*, Proc. 18th Annual Intl. ACM SIGIR Conf. on R&D in Information Retrieval, Jul. 9-13, 1995, pp. 21-28.
DeFazio et al., *Integrating IR and RDBMS Using Cooperative Indexing*, Proc. 18th Annual Intl. ACM SIGIR Conf. on R&D in Information Retrieval, Jul. 9-13, 1995, pp. 84-92.
Sclaroff et al., *ImageRover: A Content-Based Image Browser for the World Wide Web*, IEEE Workshop on Content-Based Access of Image and Video Libraries, Jun. 1997, pp. 2-9.
Knoblock, *Searching the World Wide Web*, Trends & Controversies, Jan.-Feb. 1997, pp. 8-24.
Amba et al., *Automatic Linking of Thesauri*, Proc. 18th Annual Intl. ACM SIGIR Conf. on R&D in Information Retrieval, Jul. 9-13, 1995, pp. 181-188.
Gelbart et al., *Toward a Comprehensive Legal Information Retrieval System*, Database and Expert Systems Applns., Proc. Intl. Conf. in Vienna, Austria, 1990, pp. 121-125.
Kimoto et al., *Construction of a Dynamic Thesaurus and Its Use for Associated Information Retrieval*, Proc. 13th Intl. Conf. on R&D in Information Retrieval, Sep. 5-7, 1990, pp. 227-241.
Findler, *Information Retrieval Systems*, An Artificial Intelligence Technique for Information and Fact Retrieval, 1991.
Yearwood et al., *Retrieving cases for treatment advice in nursing using text representation and structured text retrieval*, Artificial Intelligence in Medicine, Jan. 1997, vol. 9, No. 1, pp. 79-98.
Batory et al., *Implementation Concepts for an Extensible Data Model and Data Language*, acm Transactions on Database Systems, Sep. 1988, vol. 13, No. 3, pp. 231-262.
Labio et al., *The WHIPS Prototype for Data Warehouse Creation and Maintenance*,. 1997, pp. 557-559.
Haisten, *Information Discovery in the Data Warehouse*, InfoDB, vol. 9, No. 6, pp. 14-25.
Suardi et al., *Execution of Extended Multidatabase SQL*, 1993, pp. 641-650.
Romberg, *Meta-Entities Keeping Pace with Change*, Database Programming & Design, Jan. 1995, pp. 54-59.
Crane et al., “Project LINK-LINK: An Interactive Database of Administrative Record Linkage Studies”, National Center for Education Statistics and U.S. Department of Agriculture, Record Linkage Techniques—1985: Proceedings of the Workshop on Exact Matching Methodologies, Arlington, VA, pp. 311-315 (May 9-10, 1985).
Childers et al., *The IRS/Census Direct Match Study—Final Report*, Bureau of the Census—Statistical Research Division Report Series, Aug. 1, 1984, pp. 1-22.
LaPlant Jr., *Generalized Data Standardization Program Generator (GENSTAN) Program Generation System Part II*, Bureau of the Census Statistical Research Division Report Series, Jul. 22, 1986.
LaPlant Jr., *User's Guide for the Generalized Record Linkage Program Generator (GENLINK) SRD Program Generator System User's Guide: Part III*, Bureau of the Census Statistical Research Division Report Series, Sep. 1, 1986.
Winkler et al., *An Application of the Fellegi-Sunter Model of Record Linkage to the 1990 U.S. Decennial Census*.
Hernandez, *A Generalization of Band Joins and the Merge/Purge Problem*, IEEE Trans. on Knowledge and Data Engineering, 1996.
Lu et al., *Pipelined Band Join in Shared-Nothing Systems*, Proc. 1995 Asian Computing Science Conf., Dec. 1995, pp. 239-253.
Beebe, “Why are Epidemiologists Interested in Matching Algorithms?”, National Cancer Institute, Record Linkage Techniques—1985: Proceedings of the Workshop on Exact Matching Methodologies, Arlington, VA, pp. 139-143 (May 9-10, 1985).
Boruch et al., “Exact Matching of Micro Data Sets in Social Research: Benefits and Problems”, Record Linkage Techniques—1985: Proceedings of the Workshop on Exact Matching Methodologies, Arlington, VA, pp. 145-153 (May 9-10, 1985).
Scheuren, “Methodologic Issues in Linkage of Multiple Data Bases”, National Academy of Sciences, Panel on Statistics for an Aging Population (Sep. 13, 1985), reprinted Record Linkage Techniques—1985: Proceedings of the Workshop on Exact Matching Methodologies, Arlington, VA, pp. 155-178 (May 9-10, 1985).
Winkler, “Processing of Lists and String Comparison”, Energy Information Administration, Record Linkage Techniques—1985: Proceedings of the Workshop on Exact Matching Methodologies, Arlington, VA, pp. 181-187 (May 9-10, 1985).
Jaro, “Current Record Linkage Research”, U.S. Bureau of the Census, Record Linkage Techniques—1985: Proceedings of the Workshop on Exact Matching Methodologies, Arlington, VA, pp. 317-320 (May 9-10, 1985).
Smith, “Record-Keeping and Data Preparation Practices to Facilitate Record Linkage”, Statistics Canada, Record Linkage Techniques—1985: Proceedings of the Workshop on Exact Matching Methodologies, Arlington, VA, pp. 321-326 (May 9-10, 1985).
Hill et al., “Generalized Iterative Record Linkage System”, Statistics Canada, Record Linkage Techniques—1985: Proceedings of the Workshop on Exact Matching Methodologies, Arlington, VA, pp. 327-333 (May 9-10, 1985).
Howe et al., “A Generalized Iterative Record Linkage Computer System for Use in Medical Follow-up Studies”, Computers and Biomedical Research 14, pp. 327, 240 (1981).
Lee, Joon Ho, “Combining Multiple Evidence from Different Properties of Weighting Schemes”, Proceedings of the 18th Annual International ACM SIGIR Conference on Research and Development in Information Retrieval, Seattle, Washington, USA (Jul. 9-13, 1995) pp. 180-188.
Winkler, W., “The state of record linkage and current research problems,” Bureau of the Census, 1999.
Winkler, W., “Advanced methods for record linkage,” Bureau of the Census, 1994.
Li, W. et al., “Skew handling techniques in sort-merge join,” ACM SIGMOD Jun. 4-6, 2002, Madison, Wisconsin.
Monge, A., “Matching algorithms within a duplicate detection system,” Bulletin of the IEEE Computer Society Technical Committee on Data Engineering, pp. 1-7, 2000.
Haisten, M., “Designing a data warehouse,” InfoDB, vol. 9, No. 2, pp. 2-9, 2004.
Fellegi, I., “Tutorial on the Fellegi-Sunter model for record linkage,” Section II: Overview of applications and introduction to theory, pp. 127-138, 1985.
Winkler, W., “Matching and record linkage,” Business Survey Methods, Chapter 11, pp. 374-403, 1995.
Scheuren, F. et al., “Recursive merging and analysis of administrative lists and data,” Bureau of the Census, 1996.
Winkler, W., “Record linkage software and methods for merging administrative lists,” Bureau of the Census Statistical Research Division, Statistical Research Report Series No. RR2001/03, report issued: Jul. 23, 2001.
Wang, G. et al., “Automatically detecting deceptive criminal identities,” Communications of the ACM, vol. 47, issue 3, pp. 70-76, Mar. 2004.
van den Bercken et al., “The Bulk Index Join: A Genetic Approach to Processing Non-Equijoins”. Data Engineering 1999, 18 pages.
Scheuren, F. et al., “Recursive merging and analysis of administrative lists and data,” 1996.
Van Den Bercken, J. et al., “The bulk index join: A generic approach to processing non-equijoins,” 15th International Conference on Data Engineering, Mar. 23-26, 1999, 257.
Winkler, W., “Advanced methods for record linkage,” 1994.
Winkler, W., “The state of record linkage and current research problems,” 1999.

* cited by examiner

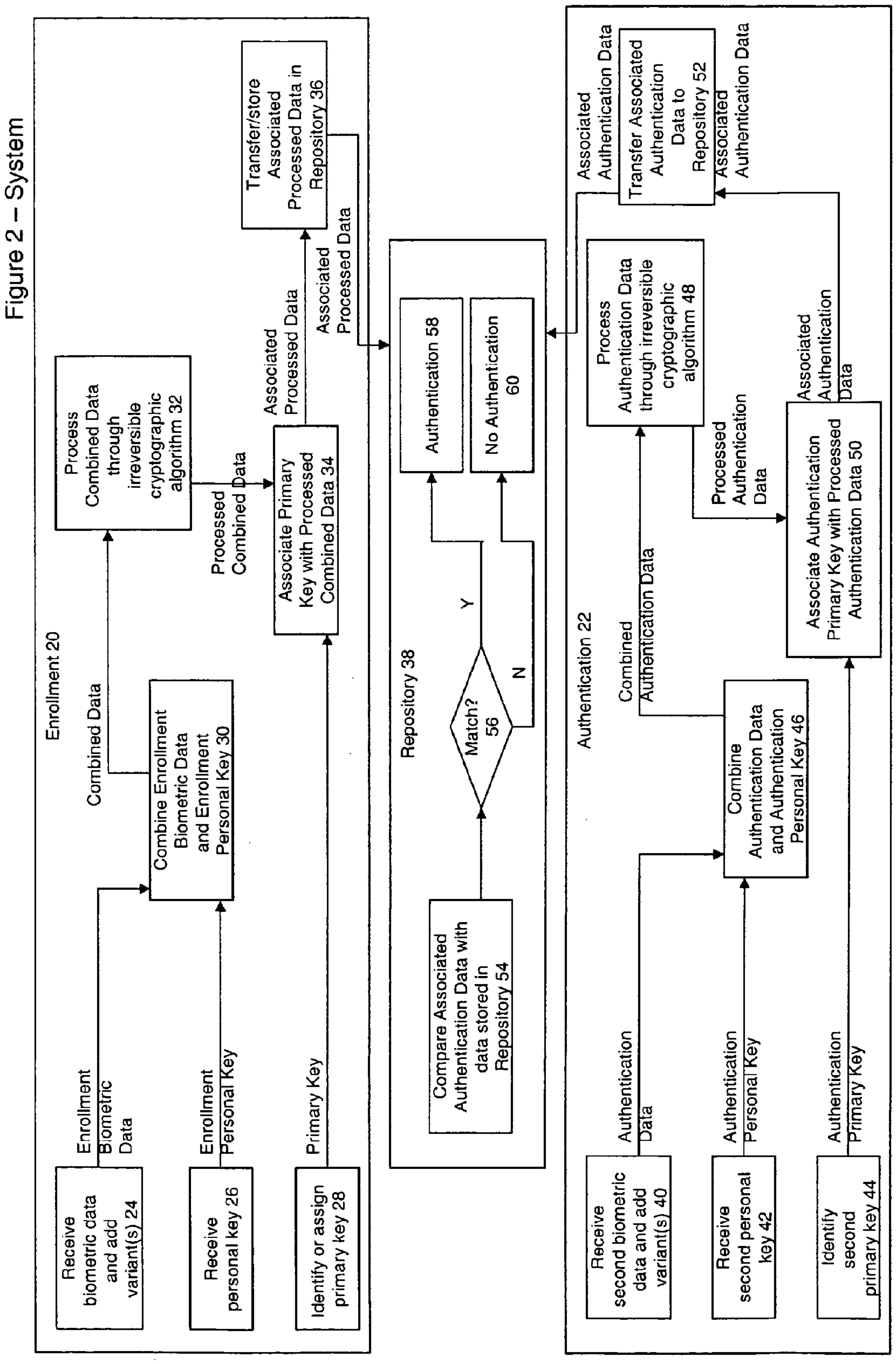

Figure 2 – System
Enrollment 20
Receive biometric data and add variant(s) 24
Enrollment Biometric Data
Receive personal key 26
Enrollment Personal Key
Identify or assign primary key 28
Primary Key
Combine Enrollment Biometric Data and Enrollment Personal Key 30
Combined Data
Process Combined Data through irreversible cryptographic algorithm 32
Processed Combined Data
Associate Primary Key with Processed Combined Data 34
Associated Processed Data
Transfer/store Associated Processed Data in Repository 36
Associated Processed Data
Repository 38
Compare Associated Authentication Data with data stored in Repository 54
Match? 56
Y
N
Authentication 58
No Authentication 60
Authentication 22
Receive second biometric data and add variant(s) 40
Authentication Data
Receive second personal key 42
Authentication Personal Key
Identify second primary key 44
Authentication Primary Key
Combine Authentication Data and Authentication Personal Key 46
Combined Authentication Data
Process Authentication Data through irreversible cryptographic algorithm 48
Processed Authentication Data
Associate Authentication Primary Key with Processed Authentication Data 50
Associated Authentication Data
Transfer Associated Authentication Data to Repository 52
Associated Authentication Data
Associated Authentication Data

AUTHORIZED ANONYMOUS AUTHENTICATION

CROSS-REFERENCE TO RELATED APPLICATIONS

The present application is a continuation of utility application Ser. No. 10/750,482 filed Dec. 31, 2003, now U.S. Pat. No. 7,702,919, which application claims the benefit of provisional application No. 60/437,416 filed Dec. 31, 2002.

FEDERALLY SPONSORED RESEARCH OR DEVELOPMENT

Not Applicable.

TECHNICAL FIELD

This invention generally relates to processing data and, more particularly, to enabling an authorized submission and authentication of certain biometric data in a confidential manner.

BACKGROUND OF THE INVENTION

Biometric data (e.g., DNA, fingerprints, retinal scans, voiceprints or other data corresponding with a physical representation of a natural person) is, and will continue to be, utilized in a variety of situations. For example, biometric research and testing has been and will likely continue to be utilized to: (a) provide greater understanding, and increase the likelihood, of curing physical challenges, (b) provide evidence supporting or undermining claims alleged in legal proceedings, (c) create greater specificity and accuracy with respect to certain archeological discoveries, and (d) using a template (e.g., a sample, abstract or other electronic or digitized system which enables sufficient parameters through an algorithmic mathematical reduction to compensate for a less than constant input or output), authenticate a natural person, such as prior to access into secure systems or facilities.

However, the increased use of biometric data has raised several privacy and ethical issues. Such issues include, without limitation: (a) using human subjects for potentially speculative results, (b) extrapolating the results of biometric testing beyond the reasonable scope of the tests, (c) establishing a framework within which to cause or increase discrimination against protected classes, and (d) using and disclosing personally identifiable information beyond the scope of any use authorized by the natural person providing the information and/or relevant privacy laws.

Some current systems use data emanating from one or a combination of the following to authenticate a natural person: (a) something the natural person knows (e.g., passwords, pass-phrases, log-on numbers), (b) something the natural person possesses (e.g., plastic ID cards, tokens), (c) a physical representation of the natural person (e.g., biometrics) and (d) a behavioral representation of the natural person (e.g., keystroke cadence). Some of the means are less reliable than others and combining various means may prove to be more reliable and provide higher certainty against any identity fraud.

Some current systems use a reversible cryptographic algorithm (e.g., encryption or encoding or other algorithm which can be reversed to the original data, such as using decryption or decoding) in association with biometric data using a template. A template is used because most biometric data changes based upon several factors, such as illness, stress, hygiene or extraction variables. For example, an authentication system may use a fingerprint of the natural person during an enrollment process to prepare a corresponding fingerprint template. Thereafter, the system may capture biometric data corresponding to the fingerprint (which is subject to collection variability or even physical changes, such as burns, blisters, scratches, or dirt, which causes the resulting data to be inconsistent as compared to earlier captured fingerprint data) and compare the captured fingerprint data to the fingerprint template in determining whether to authenticate the natural person. Depending upon the parameters (e.g., statistics, patterns or other factors) of the system and the template, the natural person identity is authenticated or rejected. The reversible cryptographic algorithm is used with the template for confidentiality purposes (e.g., while the data is in transit), but the original biometric data can be reversed and analyzed to determine whether the parameters of the system and/or the template are appropriate.

Some current systems (e.g., NT or Unix) use an irreversible cryptographic algorithm (e.g., a one-way function, such as MD-5 or other algorithm having the effect of a one-way function, such as using a reversible cryptographic algorithm and destroying the corresponding decryption key) in conjunction with password storage to authenticate the natural person, such as prior to access to a secure system. Using the irreversible cryptographic algorithm minimizes the possibility of disclosing all stored passwords should the system or password file be compromised. Furthermore, the irreversible cryptographic algorithm requires a constant input because any change in the input, such as a space, will cause a different result when processed through the irreversible cryptographic algorithm.

However, no current system, in association with a template or otherwise, utilizes the biometric data in association with the irreversible cryptographic algorithm, whether or not the biometric data is used in combination with any other means, such as a personal key.

BRIEF DESCRIPTION OF THE DRAWINGS

FIG. 2 is a flowchart of the system block in FIG. 1.

DETAILED DESCRIPTION OF THE INVENTION

Figure 1:
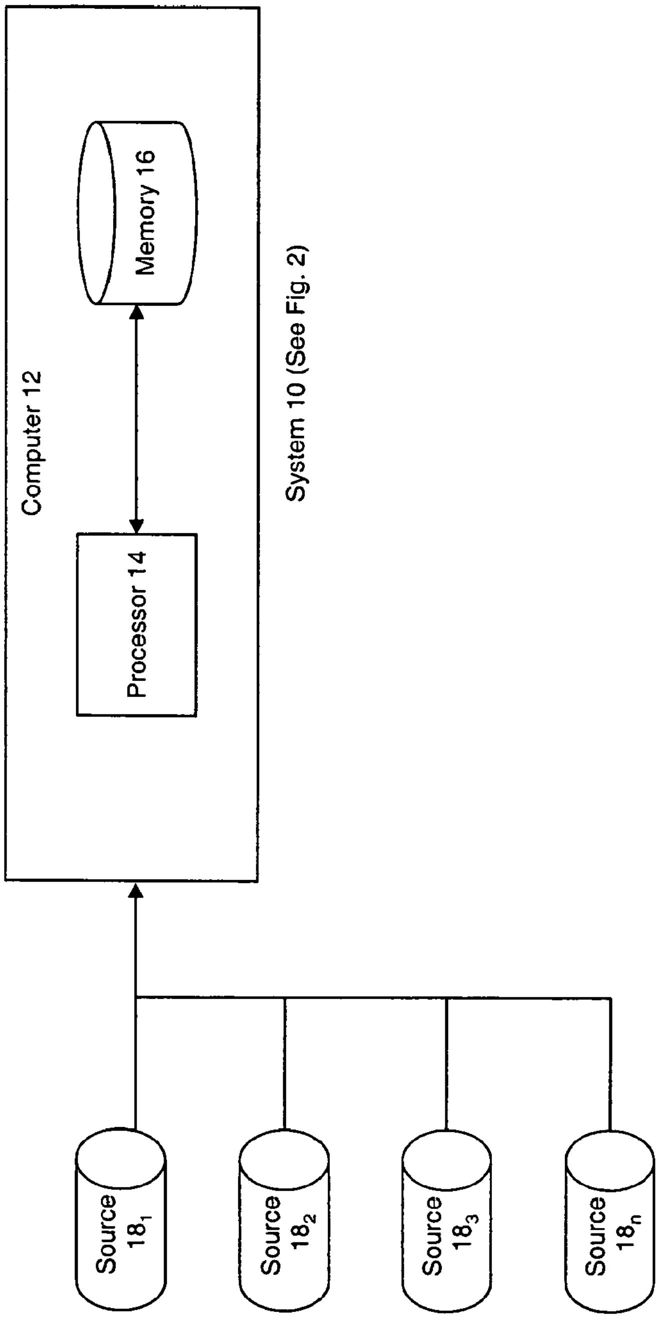
FIG. 1 is a functional block diagram of the system in accordance with the invention.

While this invention is susceptible of embodiment in many different forms, there is shown in the drawing, and will be described herein in detail, a specific embodiment thereof with the understanding that the present disclosure is to be considered as an exemplification of the principles of the invention and is not intended to limit the invention to the specific embodiment illustrated.

A data processing system 10 for processing data is illustrated in FIGS. 1-2. The system 10 includes at least one conventional computer 12 having a processor 14 and memory 16. The memory 16 is used both for storage of the executable software to operate the system 10 as well as for storage of the data in a database and random access memory. However, the software can be stored or provided on any other computer readable medium, such as a CD, DVD or floppy disc. The computer 12 receives inputs from a plurality of sources **181-18*n***.

The system 10 performs an enrollment process (i.e., process to receive and verify data corresponding with a natural person, such as in association with employment, a facility, a system and/or a privileged program like a frequent traveler program or a loyalty club program) 20 and an authentication process (i.e., process to receive and compare data to authenticate or reject the natural person and allow or reject the association with the employment, facility, system and/or other privileged program) 22. The enrollment process 20 and the authentication process 22, as further illustrated below, enables the natural person to authorize an authentication of the natural person's identity in an anonymous manner utilizing, at a minimum, biometric data and cryptographic algorithms.

The enrollment process 20 includes steps wherein the system 10: (a) receives a first biometric data from the natural person (e.g., segments of the natural person's DNA using developments in DNA sequencing, such as Polymerase Chain Reaction techniques, or facial scan data that can be embodied in a template) that is distinctive to the natural person and, independently and/or by generating one or more variants corresponding with actual or potential changes in the first biometric data, causes a result that can be processed through an irreversible cryptographic algorithm ("Enrollment Biometric Data") which, in some circumstances (e.g., circumstances wherein the natural person, laws, ethical considerations or other issues prefer that the Enrollment Biometric Data is not saved in any manner), is processed through a first irreversible cryptographic algorithm, in step 24, (b) receives a first personal key (e.g., a password, pass phrase, token, behavioral representation, a separate biometric, or other representation of the natural person's authorization) ("Enrollment Personal Key"), which is processed through a cryptographic algorithm (e.g., either the first irreversible cryptographic algorithm, a secondary irreversible cryptographic algorithm, or a reversible cryptographic algorithm) in highly confidential circumstances, in step 26, (c) identifies or assigns a primary key (e.g., an alphanumeric or numeric value corresponding with the natural person, such as an identification number) to the natural person ("Primary Key") in step 28, (d) combines (e.g., strung together, re-organized in a standard way, constant data introduced in a standard way, or other means to combine) the Enrollment Biometric Data and the Enrollment Personal Key ("Combined Data")in step 30, (e) processes the Combined Data through a second irreversible cryptographic algorithm (which can be the first irreversible cryptographic algorithm), sometimes after adding salt (i.e., additional data used to pad, modify, skew, or coat) to the Combined Data, causing the resulting data ("Processed Combined Data") to be undecipherable and irreversible (e.g., preimage resistant), in step 32, (f) associates the Primary Key with the Processed Combined Data ("Associated Processed Data") and eliminates all storage or trace of the Enrollment Biometric Data, Enrollment Personal Key and Combined Data, in step 34, and (g) transfers/stores the Associated Processed Data in a repository ("Repository") 38 in step 36.

For example, if the enrollment process 20 is in association with a trusted traveler program, the enrollment process 20 includes the step wherein the system receives the first biometric data (e.g., a DNA segment, retinal scan, facial image, or other biometric data) from a traveler and, in circumstances where the first biometric data is not constant, generates the one or more variants from the first biometric data (e.g., actual or potential changes in the DNA segment, retinal scan, facial image, or other biometric data), forming the Enrollment Biometric Data, which enables processing through the irreversible cryptographic algorithm (e.g., the Enrollment Biometric Data can be processed through the irreversible cryptographic algorithm and, in the event that the first biometric data changes thereafter, the one or more variants generated can be used, independently or by simulating fuzzy logic, to later authenticate the natural person). The enrollment process 20, in certain circumstances (e.g., to minimize concern regarding the storage of the passenger's DNA in a decipherable format), processes the Enrollment Biometric Data through the first irreversible cryptographic algorithm.

The system 20 then receives the Enrollment Personal Key and processes the Enrollment Personal Key through the cryptographic algorithm, which can be the first irreversible cryptographic algorithm, the second irreversible cryptographic algorithm, or the reversible cryptographic algorithm (e.g., if the corresponding decryption key is destroyed, the reversible cryptographic algorithm effectively becomes the secondary irreversible cryptographic algorithm).

Still using the example of the trusted traveler program, the system 20 then identifies and/or assigns the Primary Key (e.g., an alphanumeric value that can be known or unknown to the passenger), and processes the Primary Key through the cryptographic algorithm. The trusted traveler system then combines the Enrollment Biometric Data and the Enrollment Personal Key (not the Primary Key) forming the Combined Data.

The trusted traveler system then adds salt to the Combined Data and processes the salted Combined Data through the second irreversible cryptographic algorithm (which can be the first irreversible cryptographic algorithm) forming the Processed Combined Data. For example, prior to, or part of, processing the Combined Data through the second irreversible cryptographic algorithm, the salt is added to the Combined Data and the Processed Combined Data would include irreversible and undecipherable data.

The trusted traveler program then associates the Primary Key with the Processed Combined Data forming the Associated Processed Data and transfers and/or stores the Associated Processed Data in the Repository.

All or part of the process in the enrollment process 20 may be performed by various applications and equipment, depending upon the relevant confidentiality and security requirements. For example, the process may be embodied as the following, at a minimum: (a) an installed software application on the source system or (b) a box unit that self-destroys the unit upon any tampering, such as an IBM 4758 cryptographic co-processor.

The location of the Repository 38 is less critical because the Enrollment Biometric Data, the Enrollment Personal Key and the Combined Data cannot be deciphered, reversed or decrypted from the Associated Processed Data. However, the Associated Processed Data may be used for comparison purposes.

The authentication process 22 includes steps wherein the system 10: (a) receives a second biometric data and generates one or more secondary variants (which can be the one or more variants and/or the first biometric data if the first biometric data changed in a manner that the one or more secondary variants causes a result that can be processed through the first irreversible cryptographic algorithm) ("Authentication Data") in step 40 and, consistent with the confidentiality circumstances in the enrollment process, processes the Authentication Data through the first irreversible cryptographic algorithm (i.e., the same first irreversible cryptographic algorithm used in the enrollment process in step 24), (b) receives a second personal key, which if received pursuant to the natural person's authorization, is the Enrollment Personal Key ("Authentication Personal Key"), and, also consistent with the confidential circumstances in the enrollment process, processes the Authentication Personal Key through the cryptographic algorithm, in step 42, (c) identifies a second primary key (e.g., if the second primary key identified is not the Primary Key, the system can reject the natural person identity initially) ("Authentication Primary Key") in step 44, (d) combines the Authentication Data and the Authentication Personal Key ("Combined Authentication Data") in step 46, (e) processes the Authentication Data through the second irreversible cryptographic algorithm (i.e., the same second irreversible cryptographic algorithm used in the enrollment process in step 34) after adding the salt to the Combined Authentication Data, causing the resulting data ("Processed Authentication Data") to be undecipherable and irreversible, in step 48, (f) associates the Authentication Primary Key with the Processed Authentication Data ("Associated Authentication Data"), eliminating all storage or trace of the Authentication Data, Authentication Personal Key and Combined Authentication Data, in step 50, and (g) transfers the Associated Authentication Data to the Repository 38 for comparison in step 52.

For example, returning to the trusted traveler program, the authentication process 22 includes circumstances wherein the passenger or an authenticator (e.g., a natural person at a check-in station or a computer system without any human interface) wants to authenticate the passenger's enrollment in the trusted traveler program. The passenger (if the passenger authorizes authentication) provides to the authenticator the second biometric data (which may be the same value as the first biometric data if the first biometric data is constant), the first personal key (i.e., the Authentication Personal Key prior to any processing through the cryptographic algorithm) and some data to enable the system to identify the first primary key (i.e., the Authentication Primary Key). The second biometric data and the first personal key are then processed through the authentication process, associated with the first personal key and compared with the data stored in the Repository.

Furthermore, the data that could be used to identify the primary key in the trusted traveler program can be a frequent flyer number, a confirmation code or some other data for the system to identify the passenger. Thereafter, the salt is added to the Combined Authentication Data (e.g., in the same manner as the enrollment process) and the salted Authentication Data is associated with the Authentication Primary Key.

Once the Associated Authentication Data reaches the Repository 38, the system within the Repository 38 would compare the Associated Authentication Data with the database of other enrollment data in a cryptographic format in step 54. Based upon the comparison, the system within the Repository 38 would determine whether there was a match (e.g., independently and/or by simulating fuzzy logic wherein the system identifies a match, such as when the use of the variants cause predominant matches) in step 56 and provide a response confirming authentication in step 58 or indicating no authentication in step 60.

Returning to the example of the trusted traveler program, depending upon the parameters identified by the system and by simulating fuzzy logic, the system in the Repository 38 can confirm a match, even if the value of the first biometric data does not match the value of the second biometric data if, based upon certain matches by and between the one or more variants and the one or more secondary variants.

When a match exists in the trusted traveler program example, the system indicates a confirmation signal and the passenger is confirmed as an authenticated enrollee of the program. When no match exists, the system indicates a rejection signal and the passenger may be denied the benefits of the trusted traveler program and additional steps would be taken in accordance with the program rules. In the interim, given the irreversible nature of the data in the Repository 38, the data in the Repository 38 would be meaningless to any intruder or person desiring to scan or review the data, thus addressing the difficult problem associated with an inside threat or outside intruder.

All or part of the process in the authentication process 22 may be embodied within various applications and equipment, depending upon the relevant confidentiality and security requirements. For example, the process may be embodied as the following, at a minimum: (a) an installed software application on the source system or (b) a box unit that self-destroys the unit upon any tampering, such as an IBM 4758 cryptographic co-processor.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A computer-implemented method for processing data, comprising:

(a) performing, in a computer, an enrollment process, comprising:
- receiving a first biometric data and encrypting the first biometric data using an irreversible cryptographic algorithm executed by a computer;
- receiving a first personal key and encrypting the first personal key using an irreversible cryptographic algorithm executed by a computer;
- combining the encrypted first biometric data and the encrypted first personal key to form a first processed data;
- eliminating all storage or trace of the first biometric data and the first personal key in an unprocessed and unencrypted form, after the first biometric data and the first personal key have been irreversibly encrypted and before any comparison is performed; and
- storing the first processed data in a repository for use in a subsequent authentication process; and (b) performing, in a computer, an authentication process, comprising:
- receiving a second biometric data and encrypting the second biometric data using an irreversible cryptographic algorithm executed by a computer;
- receiving a second personal key and encrypting the second personal key using an irreversible cryptographic algorithm executed by a computer;
- combining the encrypted second biometric data and the encrypted second personal key to form a second processed data;
- eliminating all storage or trace of the second biometric data and the second personal key in an unprocessed and unencrypted form, after the second biometric data and the second personal key have been irreversibly encrypted and before any comparison is performed; and
- comparing the second processed data to the first processed data previously stored in the repository, without accessing either the first or second processed data in an unprocessed and unencrypted form, in order to enable an authentication process for an entity represented by the second biometric data and the second personal key in a confidential manner, wherein a signal is generated pertaining to the comparison of the second processed data to the first processed data for use in the authentication process of the entity represented by the second biometric data and the second personal key.

2. The method of claim 1, further comprising generating a first variant from the first biometric data prior to encrypting the first biometric data.

3. The method of claim 1, further comprising generating a second variant from the second biometric data prior to encrypting the second biometric data.

4. The method of claim 1, further comprising encrypting the first processed data using an irreversible cryptographic algorithm.

5. The method of claim 1, further comprising encrypting the second processed data using an irreversible cryptographic algorithm.

6. The method of claim 1, further comprising associating a first primary key with the first processed data.

7. The method of claim 1, further comprising associating a second primary key with the second processed data.

8. A computer-implemented method for processing data, comprising:

receiving a first biometric data and encrypting the first biometric data using an irreversible cryptographic algorithm executed by a computer;

receiving a first personal key and encrypting the first personal key using an irreversible cryptographic algorithm executed by a computer;

combining the encrypted first biometric data and the encrypted first personal key to form a first processed data;

eliminating all storage or trace of the first biometric data and the first personal key in an unprocessed and unencrypted form, after the first biometric data and the first personal key have been irreversibly encrypted and before any comparison is performed; and storing the first processed data in a repository for use in a subsequent authentication process;

wherein an authentication process:

receives a second biometric data and encrypts the second biometric data using an irreversible cryptographic algorithm executed by a computer;

receives a second personal key and encrypts the second personal key using an irreversible cryptographic algorithm executed by a computer;

combines the encrypted second biometric data and the encrypted second personal key to form a second processed data;

eliminates all storage or trace of the second biometric data and the second personal key in an unprocessed and unencrypted form, after the second biometric data and the second personal key have been irreversibly encrypted and before any comparison is performed;

compares the second processed data to the first processed data previously stored in the repository, without accessing either the first or second processed data in an unprocessed and unencrypted form, in order to enable an authentication process for an entity represented by the second biometric data and the second personal key in a confidential manner, wherein a signal is generated pertaining to the comparison of the second processed data to the first processed data for use in the authentication process of the entity represented by the second biometric data and the second personal key.

9. The method of claim 8, further comprising generating a first variant from the first biometric data prior to encrypting the first biometric data.

10. The method of claim 8, wherein a second variant is generated from the second biometric data prior to the second biometric data being encrypted.

11. The method of claim 8, further comprising encrypting the first processed data using an irreversible cryptographic algorithm.

12. The method of claim 8, wherein the second processed data is encrypted using an irreversible cryptographic algorithm.

13. The method of claim 8, further comprising associating a first primary key with the first processed data.

14. The method of claim 8, wherein a second primary key is associated with the second processed data.

15. A computer-implemented method for processing data, comprising:

receiving a first biometric data and encrypting the first biometric data using an irreversible cryptographic algorithm executed by a computer;

receiving a first personal key and encrypting the first personal key using an irreversible cryptographic algorithm executed by a computer;

combining the encrypted first biometric data and the encrypted first personal key to form a first processed data;

eliminating all storage or trace of the first biometric data and the first personal key in an unprocessed and unencrypted form, after the first biometric data and the first personal key have been irreversibly encrypted and before any comparison is performed; and comparing the first processed data to a second processed data previously stored in a repository, without accessing either the first or second processed data in an unprocessed and unencrypted form, in order to enable an authentication process for an entity represented by a second biometric data and a second personal key in a confidential manner, wherein a signal is generated pertaining to the comparison of the first processed data to the second processed data for use in the authentication process of the entity represented by the second biometric data and the second personal key, wherein an enrollment process:

receives the second biometric data and encrypts the second biometric data using an irreversible cryptographic algorithm executed by a computer;

receives the second personal key and encrypts the second personal key using an irreversible cryptographic algorithm executed by a computer;

combines the encrypted second biometric data and the encrypted second personal key to form the second processed data;

eliminates all storage or trace of the second biometric data and the second personal key in an unprocessed and unencrypted form, after the second biometric data and the second personal key have been irreversibly encrypted and before any comparison is performed; and stores the second processed data in the repository for use in a subsequent authentication process.

16. The method of claim 15, further comprising generating a first variant from the first biometric data prior to encrypting the first biometric data.

17. The method of claim 15, wherein a second variant is generated from the second biometric data prior to the second biometric data being encrypted.

18. The method of claim 15, further comprising encrypting the first processed data using an irreversible cryptographic algorithm.

19. The method of claim 15, wherein the second processed data is encrypted using an irreversible cryptographic algorithm.

20. The method of claim 15, further comprising associating a first primary key with the first processed data.

21. The method of claim 15, wherein a second primary key is associated with the second processed data.

* * * * *